Patented Nov. 8, 1938

2,135,747

UNITED STATES PATENT OFFICE 2,135,747

SULPHUR CEMENT

Werner W. Duecker, Pittsburgh, Pa., assignor to Texas Gulf Sulphur Company, a corporation of Texas No Drawing. Application June 27, 1935, Serial No. 28,671

1 Claim. (Cl. 106—24)

This invention relates to cements, and particularly to sulphur cement. Sulphur is commonly used as a cement, and for such use sulphur is melted and mixed with an aggregate, such as sand, and is applied while still in molten condition. Sulphur cement so prepared deteriorates with age.

From various sources it was learned that in certain instances and in certain applications sulphur cements failed rapidly, even when the service to which the cement was subjected was not judged to be particularly severe. There was no apparent explanation for these failures. The cements simply became granular and crumbly and the bond failed.

Investigation revealed the fact that when the commercial sulphur cements were formed into test bars and these bars were subjected to temperatures that fluctuated from 66° to 4° C., the bars increased in length. Evidently the bars expanded when heated but did not return to their original dimensions on cooling. The amount of growth of these bars in length seemed to be related to their age. Those which were tested one day after being cast had not grown as much as those which were tested ten or twelve days after being cast. Furthermore, it was observed that bars of cement which originally had a modulus of rupture of approximately 1500 pounds to the square inch became so weak after being subjected to fluctuating temperatures that they could be broken by hand. The phenomenon of the growth of these bars under the conditions described may explain in part why they failed in service. It may be that the constituent sulphur crystallized, and that in consequence of this the bars grew and failed.

I have discovered that, if, in a body of sulphur, olefine polysulphides or polymerization products thereof be dissolved, and if the so-modified sulphur be employed in like manner as sulphur ordinarily is employed in the preparation of cement,—that is to say, if to it an aggregate be added and worked to a uniform mixture—, two conditions will be brought about. One is that, under varying conditions of temperature, the fatiguing that I have described as characteristic of ordinary sulphur cements will not take place; and the other characteristic is that at atmospheric temperature the substance itself will have such physical properties as to render it efficacious.

Sulphur by itself is deficient in wetting qualities, and does not always form a perfect bond with a surface to which it is applied. As used in bonding together adjacent bodies, such as the bricks of a wall or pavement, such deficiency of sulphur is definitely frequently detrimental.

Primarily, my cement is a bonding cement; it being part of my discovery that the sulphur having olefine polysulphide in solution therein has the property of wetting surfaces to which it is applied, to form a firm and definite bond therewith. It has unusual utility in the cemented construction of walls, pavements, and other structure integrated from bricks, blocks, stone, and the like.

While I do not limit myself to any particular method of preparation, I find it advantageous to provide the solution of sulphides in sulphur by causing olefine in gaseous condition to percolate through a body of molten sulphur maintained at a temperature not exceeding 160° C. It is entirely possible in the conduct of this operation to intermit the percolation at any point desired, in order to obtain a product of predetermined consistency. With a relatively low percentage inclusion of olefine polysulphides, the sulphur solution is less viscous, and is more readily mixed with aggregate, and used, than a similar product containing in sulphur solution a relatively high percentage of olefine polysulphides. For many uses I have found suitable a sulphur solution of olefine polysulphides containing but from 1 to 5% olefine polysulphides.

By producing, or otherwise including, in the sulphur relatively high proportions of olefine polysulphides, I obtain an efficient bonding cement which is deformable, and which has appreciable resiliency. Such bonding cement is capable of compensating for expansion and contraction of bodies bonded together by it without destruction, or substantial impairment of the bond between the bodies by flow of the cement. Because it is deformable, the bond between the cement and the several bodies joined by it is not broken or impaired by expansion or contraction of either or both the bodies.

The above-described quality is of great value as my cement may be used; for example, in joints between relatively extended paving slabs, and the like. In degree, deformability and resilience are attributes of my cement as produced to contain a lower percentage of olefine polysulphides. Thus, for common brickwork, I have found my cement made to contain the above-noted percentage of from 1 to 5% olefine polysulphides suitable. For such purpose, convenience in use and load carrying capacity are of importance, and the tendency for expansion and contraction of the bodies to break the cemented union between them is not great.

The aggregate that is employed in the preparation of the cement may be such as the art knows, —sand, crushed cinders, or other inert solid and granular material. And the ratio in which the modified sulphur and the aggregate are compounded will be substantially such as the art knows; and (as the art knows) will be variable, within the judgment of the user.

I have discovered that, by percentage inclusion from about 5% upward of olefine polysulphides in solution in the sulphur, I have a bonding cement which may be used as a protective coating bonded to the surface of a body.

By regulation of the percentage inclusion of olefine polysulphide in the sulphur, and regulation of the quantity and particle size of the aggregate used, I may conform the coefficient of expansion of the cement to that of bodies bonded together or protectively coated.

When applied as a protective coating, and for other purposes in which it is desirable that the cement be deformable, I have found suitable a cement in which the sulphur solution of olefine polysulphide is not substantially less than a 15% solution of the olefine polysulphide. In making a deformable joint between roadway slabs of relatively great area, I have found suitable a cement including a body, or mass, of sulphur and olefine sulphide in which the olefine polysulphide is contained in solution in the sulphur, in a proportion of from 10 to 20%.

This application is a continuation-in-part of my copending application, Serial Number 722,729 filed April 27, 1934.

I claim as my invention:

A cement including a body of aggregate compounded with a body of sulphur that carries in solution an olefine polysulphide such solution being a 1 to 5% solution of the polysulphide in the sulphur.

WERNER W. DUECKER.